US009471117B1

(12) United States Patent
Spangler

(10) Patent No.: US 9,471,117 B1
(45) Date of Patent: Oct. 18, 2016

(54) SKIN TEMPERATURE OF COMPUTING DEVICE ENCLOSURE

(71) Applicant: GOOGLE INC., Mountain View, CA (US)

(72) Inventor: Randall R. Spangler, San Jose, CA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/795,921

(22) Filed: Mar. 12, 2013

(51) Int. Cl.
*G06F 1/16* (2006.01)
*G06F 1/20* (2006.01)

(52) U.S. Cl.
CPC ............. *G06F 1/203* (2013.01); *G06F 1/1613* (2013.01)

(58) Field of Classification Search
CPC ....................................................... H05K 5/00
USPC ................................................... 361/679.48
See application file for complete search history.

(56) References Cited

U.S. PATENT DOCUMENTS

| | | | | | |
|---|---|---|---|---|---|
| 4,470,263 | A * | 9/1984 | Lehovec | ............ | A41D 13/0053 62/259.3 |
| 5,802,865 | A * | 9/1998 | Strauss | ............... | A41D 13/0025 62/259.3 |
| 6,125,636 | A * | 10/2000 | Taylor | ........................ | A61F 7/10 62/259.3 |
| 6,362,740 | B1 * | 3/2002 | Jung | ..................... | G08B 3/1041 340/573.1 |
| 6,806,722 | B2 * | 10/2004 | Shon | ..................... | G01N 27/121 324/694 |
| 7,186,957 | B2 * | 3/2007 | Martin | .................. | A43B 3/0005 219/212 |
| 7,571,615 | B1 * | 8/2009 | Bikes | ...................... | A42B 3/285 62/259.3 |
| 8,608,437 | B1 * | 12/2013 | Cantin, Jr. | .............. | F04B 35/06 415/206 |
| 8,658,943 | B1 * | 2/2014 | Larsen | ...................... | A61F 7/02 219/211 |
| 2003/0139654 | A1 * | 7/2003 | Kim | .................... | A61B 5/02405 600/300 |
| 2003/0166996 | A1 * | 9/2003 | Kim | ........................ | A01K 29/00 600/300 |
| 2004/0117212 | A1 * | 6/2004 | Kong | ..................... | G06Q 50/22 705/2 |
| 2004/0123977 | A1 * | 7/2004 | Pokharna | .................. | G06F 1/20 165/47 |
| 2007/0123391 | A1 * | 5/2007 | Shin | ...................... | A43B 3/0005 482/8 |
| 2007/0291817 | A1 * | 12/2007 | Bradicich | .............. | G01N 25/18 374/15 |
| 2008/0055848 | A1 * | 3/2008 | Hamburgen | .............. | G06F 1/20 361/691 |
| 2010/0128754 | A1 * | 5/2010 | Jetter | .................. | A61B 5/14532 374/110 |
| 2010/0198322 | A1 * | 8/2010 | Joseph | ..................... | A61F 7/007 607/108 |
| 2010/0259886 | A1 * | 10/2010 | Mongia | ................... | G06F 1/203 361/679.47 |
| 2011/0032105 | A1 * | 2/2011 | Hoffman | ................. | G04F 10/00 340/573.1 |
| 2011/0282168 | A1 * | 11/2011 | Weiss | ..................... | A61B 5/742 600/323 |
| 2012/0242697 | A1 * | 9/2012 | Border | .............. | G02B 27/0093 345/633 |
| 2012/0325013 | A1 * | 12/2012 | Rubenstein | ............... | G06F 1/20 73/861.08 |
| 2013/0106684 | A1 * | 5/2013 | Weast | ................. | G06F 19/3481 345/156 |
| 2013/0261405 | A1 * | 10/2013 | Lee | ........................ | A61B 5/681 600/301 |
| 2014/0143785 | A1 * | 5/2014 | Mistry | .................. | G06F 9/4893 718/104 |
| 2014/0316305 | A1 * | 10/2014 | Venkatraman | ........ | A61B 5/1112 600/595 |

* cited by examiner

*Primary Examiner* — Courtney Smith
*Assistant Examiner* — Rashen E Morrison
(74) *Attorney, Agent, or Firm* — Brake Hughes Bellermann LLP

(57) ABSTRACT

A method for controlling outer surface temperatures of a computing device enclosure or case includes operating one or more internal thermal management mechanisms to control an internal temperature inside the computing device enclosure or case, obtaining a measure of an external ambient temperature outside the computing device case, and making operation of the one or more internal thermal management mechanisms depend, at least in part, on the measure of the external ambient temperature.

27 Claims, 6 Drawing Sheets

510
executing a solution on a computing device to operate one or more "internal" thermal management mechanisms that are deployed in the computing device to control an internal temperature or heat-generation inside the computing device casing

511
obtaining a measure of an "external" ambient temperature outside the computing device casing

512
using a temperature sensor that is physically integrated with the computing device casing to measure the ambient air temperature proximate to the computing device

513
using a remote temperature sensor that is not physically integrated with the computing device enclosure or casing to provide a measure of the ambient air temperature proximate to the computing device

514
making operation of the one or more internal thermal management mechanisms depend, at least in part, on the measure of the external ambient temperature

515
defining an acceptable skin temperature as a function of the external ambient temperature

516
activating a first internal thermal management mechanism (e.g., a mechanical fan) when the skin temperature begins to increase and exceeds a threshold acceptable skin temperature value that depends on the ambient temperature value

517
utilizing all or most of a full cooling capacity of the first internal thermal management mechanism (e.g., by running the cooling fan to its maximum speed)

518
only then utilizing an additional thermal management mechanism that involves shutting down or throttling performance of a device component to reduce heat generation

SKIN TEMPERATURE OF COMPUTING DEVICE ENCLOSURE

TECHNICAL FIELD

This description generally relates to computing devices. The description, in particular, relates to heat or thermal management solutions for computing devices.

BACKGROUND

Portable computing devices (e.g., laptops, personal/enterprise digital assistants, smartphones, tablet computers, ultra-mobile computers, wearable computers, etc.) have become ubiquitous at least in part because they are increasingly more affordable and yet more powerful.

Newer portable computing device designs (e.g., ultrathin laptops, ultra slim smartphones, etc.) are directed toward making the devices thinner in size and lighter in weight so that consumers can easily carry them around and hold to operate. Even though the newer computing devices may have smaller form factors and smaller enclosure sizes than older versions of the devices, they can include powerful computer chips (e.g., microprocessors, RAM, etc.) that generate the same or more heat than the computer chips used in older or larger enclosure-size versions of the computing devices. Traditional heat or thermal management solutions for computing devices generally address the challenge of avoiding temporary malfunction or permanent failure of components (e.g., CPUs, chipset, graphic cards, and storage devices, etc.) due to overheating of semiconductor junction temperatures (e.g., above 100° C.). The traditional heat or thermal management solutions avoid overheating of the device components by extracting and expelling heat from the computing device enclosures, for example, by exhausting hot air from the enclosures or using heat pumps. Additionally, the traditional heat or thermal management solutions may avoid overheating of the device components by throttling performance of heat-generating device components. For the newer smaller enclosure-size or smaller form factor computing devices, a further thermal challenge is ergonomic: maintaining external enclosure temperatures at safe levels so that users can touch or handle operational computing devices without discomfort or injury.

Consideration is now being given heat or thermal management solutions for keeping computing device enclosure surface temperatures in a safe and comfortable range for human contact or touch.

SUMMARY

In one general aspect, a portable computing device includes a housing or case enclosing one or more integrated circuits (e.g., a processor, a memory, etc.) and a temperature sensor, which is physically integrated with the portable computing device case. The temperature sensor is configured to measure an external ambient temperature. The portable computing device (e.g., a laptop computer, a hand held computer, a tablet computer, a net book computer, a personal digital assistant, an enterprise digital assistant, a smart phone, a wearable computer and a mobile computing device) is configured for use with the portable computing device case in bodily contact with a user.

In an aspect, the portable computing device includes a cooling fan configured to direct airflow through the portable computing device case, and a solution configured to make operation of the cooling fan responsive, at least in part, to the external ambient temperature. The solution includes an algorithm that defines an acceptable skin temperature of an outer surface of the portable computing device case as a function of the external ambient temperature and operates the cooling fan toward keeping a skin temperature of the outer surface of the portable computing device case at or below the acceptable skin temperature defined for the external ambient temperature. The solution includes different fan speed control curves for different external ambient temperature values.

In further aspect, the solution is configured to rely on throttling performance of heat-generating device components in the portable computing device case toward keeping the skin temperature of the outer surface of the portable computing device case at or below the acceptable skin temperature only after utilizing a full cooling capacity of the cooling fan.

In a general aspect, a computing device includes one or more internal thermal management mechanisms configured to control an internal temperature inside a case which houses computing device components, and a processor configured to execute a solution to operate the one or more internal thermal management mechanisms. The solution is configured to receive a measure of an external ambient temperature outside the case and to make operation of the one or more internal thermal management mechanisms responsive, at least in part, to the measure of the external ambient temperature.

In an aspect, the solution includes an algorithm that defines an acceptable skin temperature for the computing device's case as a function of the external ambient temperature. The solution is configured to utilize the one or more internal thermal management mechanisms toward keeping a skin temperature of computing device's case at or below the acceptable skin temperature defined for the external ambient temperature.

In a further aspect, the solution is configured to utilize a cooling fan in the one or more internal thermal management mechanisms toward keeping a skin temperature of computing device's case at or below the acceptable skin temperature defined for the external ambient temperature. In an aspect, the solution includes different fan speed control curves for different external ambient temperature values.

In a general aspect, a method for controlling skin temperatures of a computing device case includes executing a solution on a computing device to operate one or more internal thermal management mechanisms that are deployed in the computing device to control an internal temperature inside the computing device case, obtaining a measure of an external ambient temperature outside the computing device case, and making operation of the one or more internal thermal management mechanisms depend, at least in part, on the measure of the external ambient temperature.

In an aspect, the method includes using a temperature sensor that is physically integrated with the computing device case to measure the external ambient temperature outside the computing device case, defining an acceptable skin temperature as a function of the external ambient temperature, and activating a first internal thermal management mechanism when the skin temperature begins to increase and exceeds a threshold acceptable skin temperature value that depends on the external ambient temperature value.

In a further aspect, the method further includes utilizing a full cooling capacity of a fan before utilizing an additional thermal management mechanism that involves shutting down or throttling performance of a device component to reduce heat generation in the computing device case.

The details of one or more implementations are set forth in the accompanying drawings and the description below. Other features will be apparent from the description and drawings, and from the claims.

BRIEF DESCRIPTION OF THE DRAWINGS

FIG. 5 is flowchart illustrating an example method for controlling outer surface temperatures of a computing device enclosure or case, in accordance with the principles of the disclosure herein.

Like reference symbols in the various drawings indicate like elements.

DETAILED DESCRIPTION

An "ergonomic" heat or thermal management solution ("the ergonomic cooling solution" or "the solution") hosted on a computing device is designed to prevent outer surfaces of the computing device's enclosure or case, which can be touched or bodily contacted by a user, from overheating, in accordance with the principles of the disclosure herein.

The ergonomic cooling solution may recognize that temperature sensation and temperature comfort physiologically can depend on the ambient temperature (e.g., in a cold environment, a user may find holding or touching a hot water bottle to be comfortable; and conversely, in a hot environment, the user may find holding or touching even a moderately warm water bottle to be uncomfortable).

The ergonomic cooling solution described herein may keep a temperature ("a skin temperature") of a user-contactable surface of the computing device's enclosure or case at an acceptable level that is below temperature levels that may cause discomfort or injury to a user of the computing device. The computing device may include a thermal cooling system and/or a power consumption management circuit for heat-generating components (e.g., integrated circuits) the computing device enclosure or case. The thermal cooling system and/or power consumption management circuit (which may be referred to herein, individually or collectively, as the "internal cooling system") may control heat generation and/or heat dissipation from within the computing device enclosure or case. The ergonomic cooling solution may operate the internal cooling system to control the skin temperature of the device enclosure or case.

Further, the ergonomic cooling solution of the present disclosure may involve using a measure of an ambient temperature external to the computing device's enclosure or case as a parameter ("external temperature") to control operation of the internal cooling system of the computing device. An acceptable skin temperature may be defined as a function of the external temperature in recognition of the physiology of temperature sensation and temperature comfort. The ergonomic cooling solution may use the internal cooling system to keep the skin temperature of the user-contactable surface of the computing device's housing or case at or below an acceptable skin temperature value corresponding to a measured external temperature, in accordance with the principles of the disclosure herein.

The ergonomic cooling solution may be implemented in any computing device (e.g., a laptop computer, a tablet, a netbook, a PDA, a smart phone or other portable computing device) in which surface contact temperatures of the computing device enclosure or case may be of ergonomic concern because of the heat generated by device components or integrated circuits (e.g., display lights, CPUs, chipset, graphic cards, DRAMs, other storage devices, etc.) inside the device.

Figure 1:
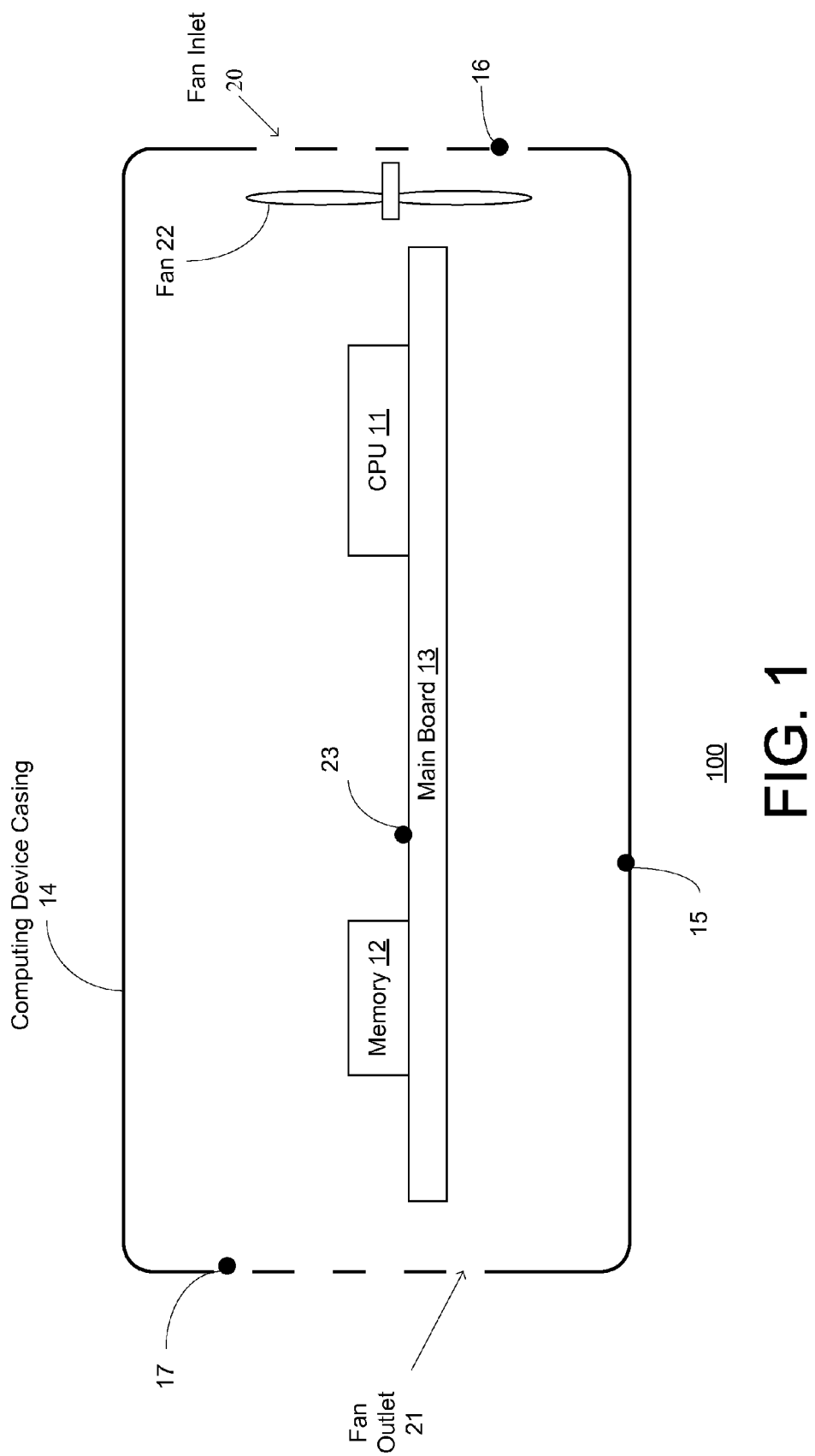
FIG. 1 is a schematic illustration of an example computing device that can host an ergonomic cooling solution, in accordance with the principles of the disclosure herein.

FIG. 1 is a schematic representation of an example computing device 100, which may host the ergonomic cooling solution of the present disclosure. Computing device 100 may include heat-generating computing device components or integrated circuits (e.g., CPU 11, Memory 12, etc.) mounted on a main board 13, which is disposed inside a computing device case 14.

The ergonomic cooling solution may involve using one or more suitably disposed external temperature sensors (e.g., sensors 15, 16, and 17) that are physically integrated with the computing device's case 14 to measure an ambient air temperature surrounding the computing device. In an example implementation of the solution, an external temperature sensor (e.g., sensor 15) may be disposed on an external surface of computing device case 14 to measure the ambient air temperature immediately proximate to the computing device. In another example implementation of the solution, an external temperature sensor (e.g., sensor 16) may be disposed in a fan inlet 20 or other opening in computing device case 14 to measure a temperature of air that may flow into the computing device case 14 from outside before it is heated by heat-generating components or integrated circuits inside the computing device case 14. In yet another example implementation of the solution, an external temperature sensor (e.g., sensor 17) may be disposed on a fan outlet 21 or other opening in the computing device case 14 to measure a temperature of air that may flow out of computing device case 14 after it has been heated by heat-generating components or integrated circuits inside the computing device case 14. In all of the foregoing example implementations, the respective external temperature sensors may be integrated with computing device case 14 in a discreet manner so that they visually blend in and do not present a visual or cosmetic discontinuity in the external appearance or style of computing device 100.

An alternate implementation of the solution may involve using a remote external temperature sensor (e.g., a room temperature monitor or room thermostat) (not shown) to measure the ambient air temperature surrounding the computing device. Such a remote external temperature sensor, which is not physically integrated with the computing device case 14, may be configured to communicate room temperature readings to the computing device, for example, via a wireless communication link.

In addition to the external temperature sensor or sensors for measuring the external temperature, computing device 100 may include one or more temperature sensors or heat-sensing circuits disposed inside the computing device enclosure or case for measuring temperatures ("internal temperatures") at one or more locations internal to the computing device case 14. The computing device may, for example, include a temperature or heat sensing circuit integrated with a heat-generating component (e.g., a CPU or GPU) in the computing device to measure a temperature of the heat-generating component. Alternatively or additionally, the computing device may, for example, include a temperature sensor 23 disposed on a motherboard or other fixture (e.g., main board 13) inside computing device case 14 to measure an internal ambient temperature.

Figure 2:
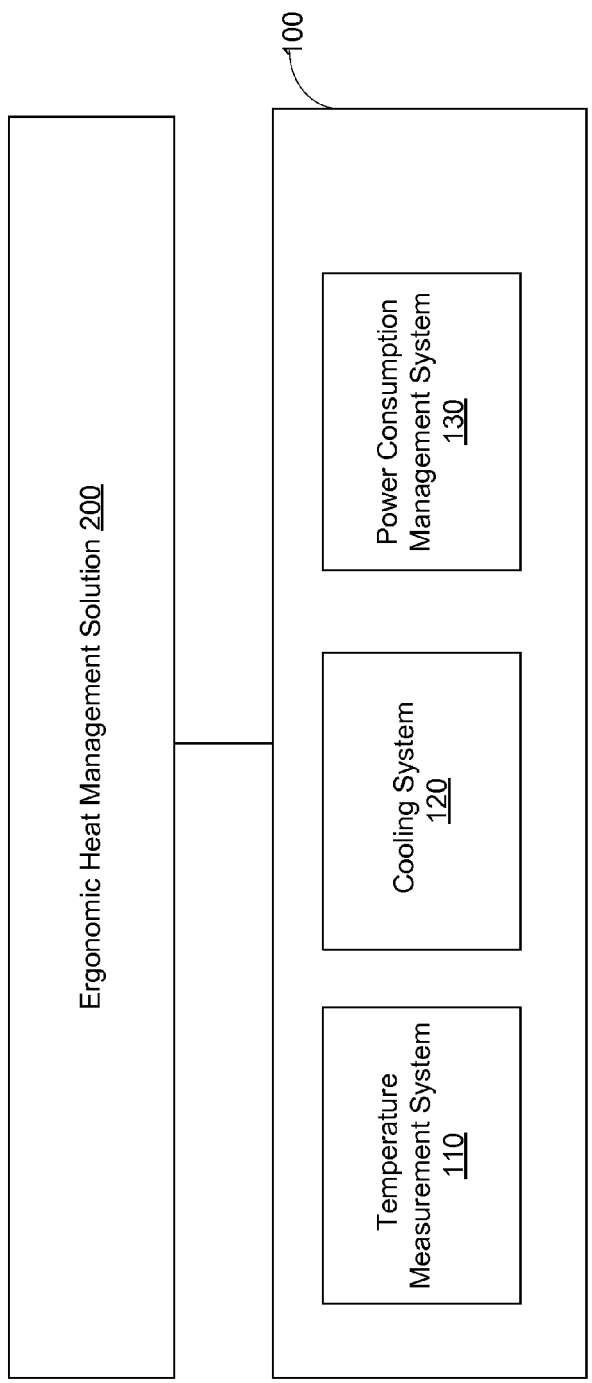
FIG. 2 is a block diagram illustration of some of the systems or subsystems of the computing device of FIG. 1 that can be involved in implementing an example ergonomic cooling solution, in accordance with the principles of the disclosure herein.

The various thermal sensors and heat sensing circuits that may be present in computing device 100 for measuring external temperatures, internal temperatures and/or heat generation may be collectively referred to herein as a "temperature sensing system" of computing device 100. FIG. 2 is a schematic block diagram representation of some of the various systems or subsystems of computing device 100 (including a temperature sensing system 110) that may be involved in implementing an example ergonomic cooling solution 200 on computing device 100, in accordance with the principles of the disclosure herein.

With reference to FIGS. 1 and 2, computing device 100 may also include a cooling system 120, which employs directed airflow or forced air convection to cool heat-generating components or integrated circuits inside computing device case 14. Cooling system 120 may include a mechanical fan 120 to direct airflow inside computing device case 14. Cooling system 120 may be designed to cool (i.e. spot cool) a single integrated circuit or small area individually, for example, by directing airflow toward the small area. Additionally or alternatively, cooling system 120 may be designed to generally reduce an ambient temperature inside computing device case 14. For this purpose, mechanical fan 22 may pull cool air into or exhaust hot air from computing device case 14 through inlets 20 and outlets 21, respectively. The cooling system may include a fan speed control circuit (not shown) that may spin fan 22 up or down in speed in response to, for example, an internal ambient temperature measurement by temperature sensor 23 or other temperature-sensing circuits inside computing device case 14.

Computing device 100 may further deploy a power consumption management system 130, which may, in response to internal temperature measurements, reduce power consumption and consequent heating of critical integrated circuits by reducing workload. Power consumption management system 130, which may be implemented by computer circuit design and operating system functions, may shut down or throttle computing device component performance, fully or partially, if a certain critical internal temperature exceeds a specified limit. For a semiconductor integrated circuit (e.g., a CPU or GPU) in computing device 100, an instantaneous semiconductor junction temperature may be critical. Power consumption management system 130 may, for example, shut down or throttle the CPU or GPU when a high instantaneous semiconductor junction temperature (e.g., 100° C.) is detected by a temperature- or heat-sensing circuit integrated with the device component or integrated circuit.

The aforedescribed cooling system 120 and power consumption management system 130 (collectively "internal cooling systems") in computing device 100 may be the same or similar to like internal cooling systems that are conventionally deployed in computing devices to cool device components, control heat generation or to keep temperatures of the device components within safe operating ranges. The ergonomic cooling solution of the present disclosure (e.g., ergonomic cooling solution 200) may be further configured to utilize the aforedescribed internal cooling systems in computing device 100 to control a skin temperature of computing device case 14. In some implementations (e.g., for small form factor computing devices), activation of the internal cooling systems in practice may be more related to skin temperature control than to device component and semiconductor junction temperature control because the device components may be able to operate at higher temperatures (e.g., 100° C.) than the skin temperatures that are safe or comfortable for a use (e.g., close to a normal body temperature 37° C.) r.

Ergonomic cooling solution 200 may be implemented in computing device 100 by making the operation of the internal cooling systems of the computing device responsive to an external temperature obtained by temperature sensing system 110. The internal cooling systems, which decrease heat generation or increase heat dissipation from inside of the computer device enclosure or case, may be responsively operated to keep the skin temperature of a user-contactable surface of the computing device's enclosure or case at an acceptable skin temperature level. To keep the skin temperature at the acceptable levels, the internal cooling systems may, for example, spin up its cooling fans and/or throttle performance of computing device components.

As noted earlier, the acceptable skin temperature levels for a computing device may be set or defined based on considerations of the human physiology of temperature sensation and temperature comfort. Ergonomic cooling solution 200 may include a temperature control algorithm which defines or adjusts an acceptable skin temperature value ("ST") as a function of the external ambient temperature ("AT"). A s the external ambient temperature increases, the temperature control algorithm may, for example, decrease the acceptable skin temperature value. Conversely, a s the external ambient temperature decreases, the temperature control algorithm may increase the acceptable skin temperature value. However, any increases in the acceptable skin temperature value may be bounded or limited ($ST_{max}$) so that even when the external ambient temperature has decreased to extremely low levels (e.g., 0° C.) the computing device surfaces are always kept at temperatures below levels that might cause discomfort, injury or burn to a user.

Figure 3:
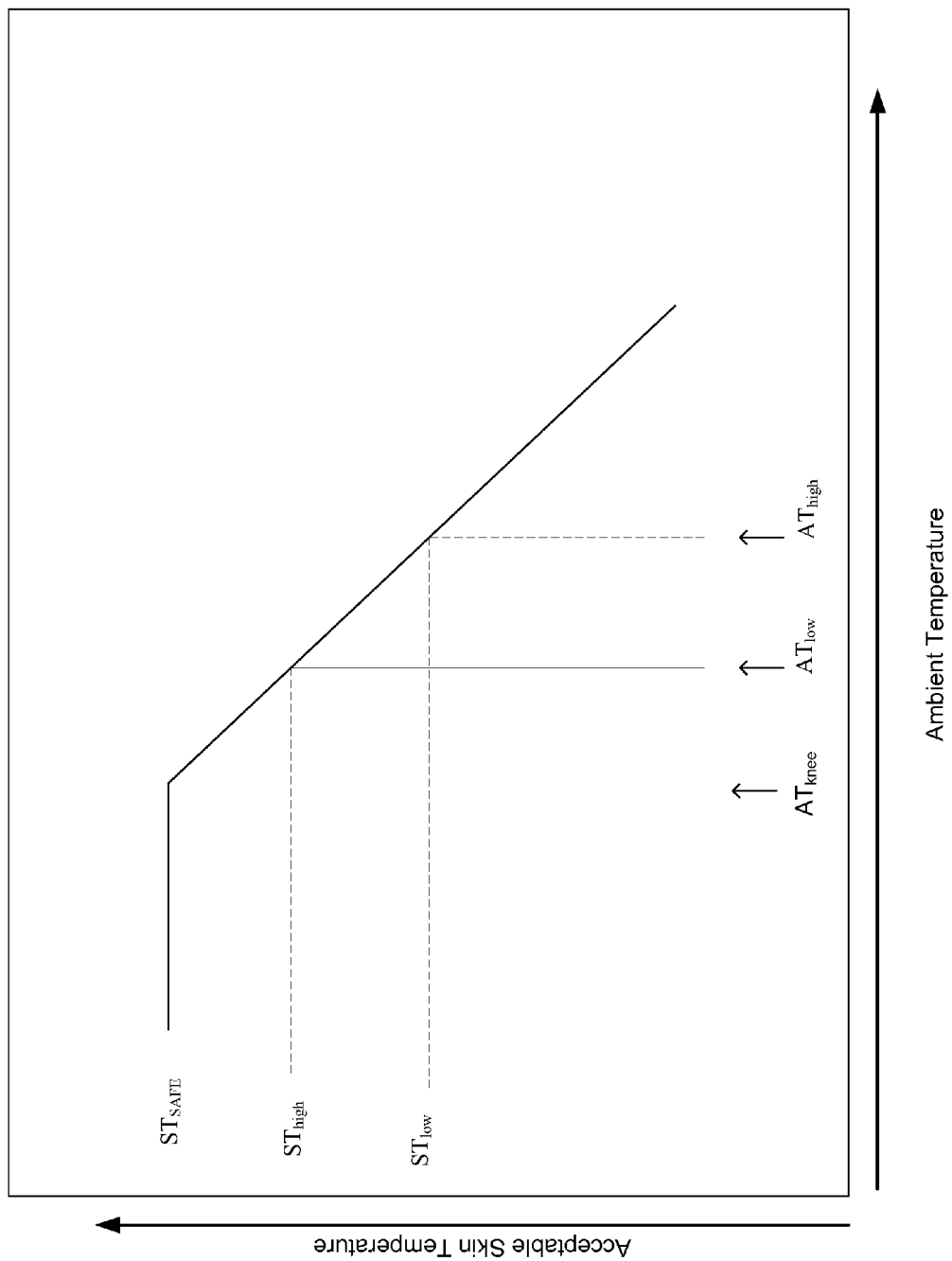
FIG. 3 is an illustrative plot of an example functional dependence of acceptable skin temperature on ambient temperature that can be implemented by a temperature control algorithm in the ergonomic cooling solution of FIG. 2, in accordance with the principles of the disclosure herein.

FIG. 3 shows an example piece-wise linear functional dependence of acceptable skin temperature ST on ambient temperature AT that may be implemented using the temperature control algorithm in ergonomic cooling solution 200. With reference to the figure, for a lower ambient temperature range (e.g., $T<AT_{knee}$) the acceptable skin temperature value may be a constant value (e.g., $ST_{SAFE}$). For a higher ambient temperature range (e.g., $T>AT_{knee}$) the acceptable skin temperature value may be reduced linearly as a function of increasing ambient temperature. Using this example functional dependence of the acceptable skin temperature on the ambient temperature in the temperature control algorithm may cause ergonomic cooling solution 200 to activate the internal cooling system to achieve a lower skin temperature for a higher external ambient temperature than for a lower external ambient temperature. The figure shows, for example, higher ambient temperature $AT_{high}$ corresponding to a lower acceptable surface temperatures $ST_{low}$ than lower ambient temperature $AT_{low}$ which corresponds to a higher acceptable surface $ST_{high}$.

It will be understood that the piece-wise linear functional dependence of the acceptable skin temperature on ambient temperature shown in FIG. 3 is only an illustrative example of a functional dependence that may be used in the temperature control algorithm. Other functional dependences (e.g., stair-step, exponential, etc.) may be used in the temperature control algorithm to define different acceptable skin temperature values for different ambient temperatures.

Figure 4:
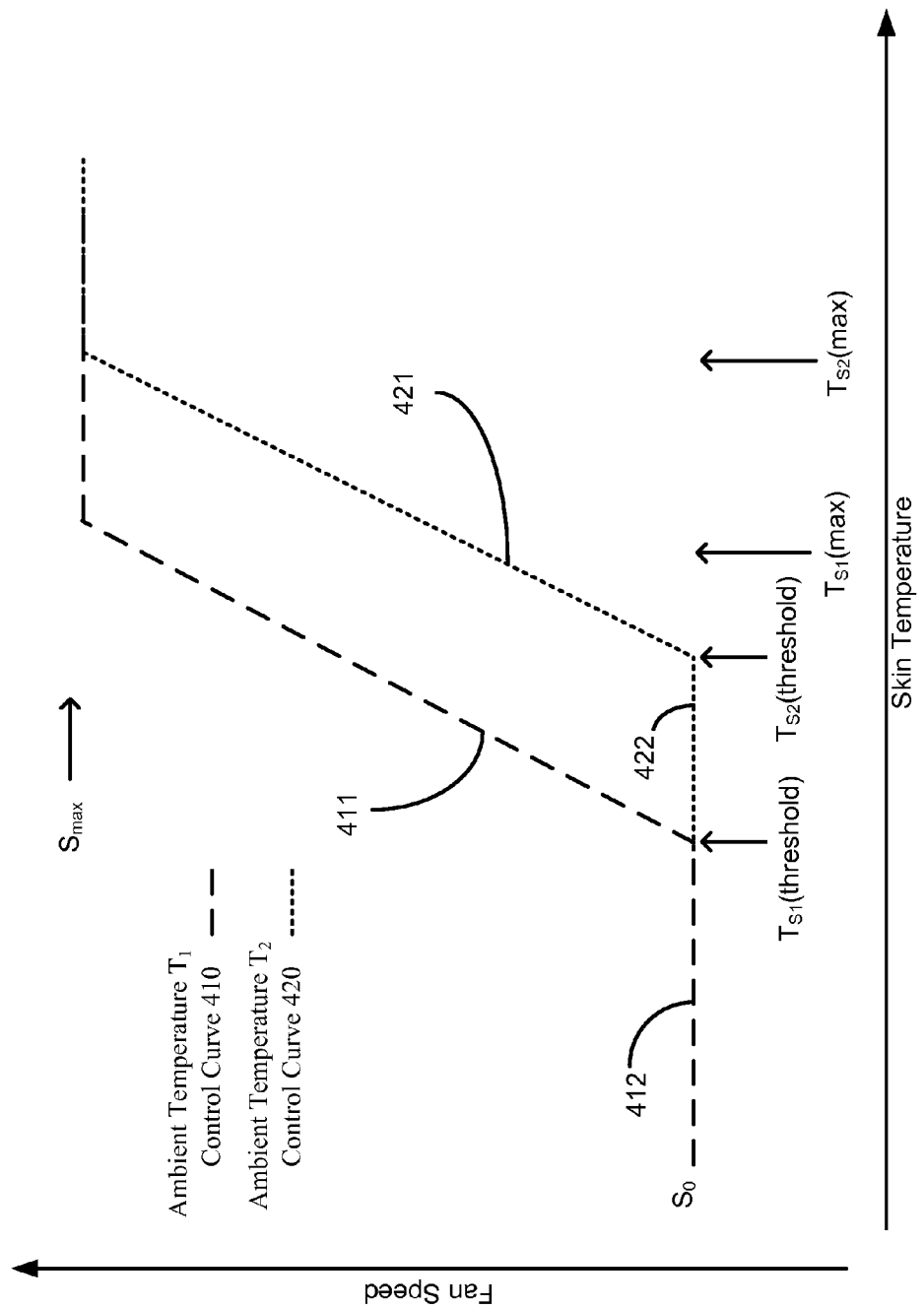
FIG. 4 is an illustrative plot of example fan speed control curves that can be implemented by the ergonomic cooling solution in the computing device of FIG. 1, in accordance with the principles of the disclosure herein.

FIG. 4 shows an illustrative example of how ergonomic cooling solution 200 may activate the internal cooling systems in computing device 100 differently for different external ambient temperatures. FIG. 4, in particular, shows fan speed vs. skin temperature control curves 410 and 420 that may be implemented by ergonomic cooling solution 200 for a cooling fan (e.g., cooling fan 22) in the computing device 100 for different ambient temperatures. Fan speed control curves 410 and 420 as shown may, for example, correspond to a higher ambient temperature $T_1$ and a lower ambient temperature $T_2$, respectively.

It will be noted that skin temperature used in the plot of fan speed control curves 410 and 420 (and shown on the x-axis in FIG. 4) may be a skin temperature, which is directly measured on the user-contactable surface of the computing device's enclosure or case. Alternatively, the skin temperature used in fan speed control curves 410 and 420 may be an inferred skin temperature, which is determined, for example, with reference to temperature measurements by an internal temperature sensor (e.g., sensor 23) inside the computing device's enclosure or case.

Fan speed control curves 410 and 420, as shown in FIG. 4, both may include a flat portion (412 and 422, respectively) corresponding to low ambient temperatures at which cooling fan 22 is stationary or turned off. For the higher ambient temperature $T_1$ case, as indicated by the linearly-increasing portion 411 of fan speed control curve 410, cooling fan 22 may start spinning up to begin cooling heat-generating device components in computing device 100 when the skin temperature is about $T_{S1}$. For the lower ambient temperature $T_2$ case, as indicated by the linearly increasing portion 421, the cooling fan may start spinning up to begin cooling the heat-generating device-components in the computing device when the skin temperature is about $T_{S2}$, which is higher than the skin temperature $T_{S1}$.

In both the ambient temperature $T_1$ and $T_2$ cases shown, the fan speed control curves level out when the cooling fan reaches a maximum speed ($S_{max}$) corresponding to a maximum cooling capacity of the cooling fan. However, for the lower ambient temperature $T_2$ case, fan speed control curve 420 levels out at a skin temperature $T_{S2}$ (max), which is higher than a skin temperature $T_{S1}$ (max) at which fan speed control curve 410 for the higher ambient temperature $T_1$ case levels out. After cooling fan 22 reaches its maximum speed ($S_{max}$), the ergonomic cooling solution may rely on the power consumption management circuits in the internal cooling systems for further cooling capacity to keep the skin temperature at acceptable levels. The power consumption management circuits in the internal cooling systems may throttle performance or shut down functions of heat-generating device-components in the computing device toward to keeping the skin temperature at acceptable levels after the maximum cooling capacity of the cooling fan is utilized. By making the fan speed control curves depend on the ambient temperature, the ergonomic cooling solution of the present disclosure may allow the computing device to run at full performance longer (e.g., up to $T_{S2}$ (max)) at least in some circumstances (e.g., at lower ambient temperatures) than cooling solutions that utilize an ambient-temperature independent fan speed control curve.

FIG. 5 is flowchart illustrating an example method 500 for controlling a temperature ("a skin temperature") of an outer case surface of a computing device (e.g., a laptop, tablet, desktop, smart phone, etc.). The skin temperature of the computing device case may be related to an "internal" temperature or heat-generation inside the computing device case by the thermal conductivity of intervening materials. The method may include but does not require measuring the skin temperature directly. The skin temperature may be inferred from the internal temperature or heat-generation inside the computing device case, for example, by analyzing heat transfer based on the thermal properties of the computing device case and enclosed structures.

Method 500 may include executing a solution on the computing device to operate one or more "internal" thermal management mechanisms that may be deployed in the computing device to control the internal temperature or heat-generation inside the computing device case (510) and thus control the skin temperature of the outer case surface. The one or more thermal management mechanisms deployed in the computing device may, for example, include a mechanical fan that can direct airflow into and/or exhaust air from within the computing device case. The one or more thermal management mechanisms may further include a power consumption management circuit that can shut down or throttle performance of a computing device component (e.g., an integrated circuit, CPU, display light, etc.) to reduce heat generation by the device component.

Method 500 may further include obtaining a measure of an "external" ambient temperature outside the computing device case (511) and making operation of the one or more internal thermal management mechanisms depend, at least in part, on the measure of the external ambient temperature (514).

Obtaining a measure of an external ambient temperature outside the computing device case 511 may include using a temperature sensor that is physically integrated with the computing device case to measure the ambient air temperature proximate to the computing device (512). The temperature sensor that is physically integrated with the computing device case may be disposed on an external surface or in a fan inlet, fan outlet or other opening the computing device case. Additionally or alternatively, obtaining a measure of an external ambient temperature outside the computing device case 511 may include using a remote temperature sensor that is not physically integrated with the computing device enclosure or case, but which can provide a measure of the ambient air temperature proximate to the computing device (513).

Making operation of the one or more internal thermal management mechanisms depend on the measure of an external ambient temperature 514 may include defining an acceptable skin temperature as a function of the external ambient temperature (515). At least over a range of ambient temperatures, the acceptable skin temperature may be defined in inverse proportion to the ambient temperature so that a lower ambient temperature corresponds to a higher acceptable skin temperature and vice versa.

In method 500, executing a solution on the computing device to operate one or more internal thermal management mechanisms 510 may include activating a first internal thermal management mechanism (e.g., a mechanical fan) when the skin temperature begins to increase and exceeds a threshold acceptable skin temperature value that depends on the ambient temperature value 516. A low ambient temperature value may correspond to a higher threshold acceptable skin temperature value and vice versa.

Method 500 may further involve utilizing all or most of a full cooling capacity of the first internal thermal management mechanism (e.g., by running the cooling fan to its maximum speed) (517) and only then utilizing an additional thermal management mechanism that may involve shutting down or throttling performance of a device component to reduce heat generation in the computing device (518).

Figure 6:
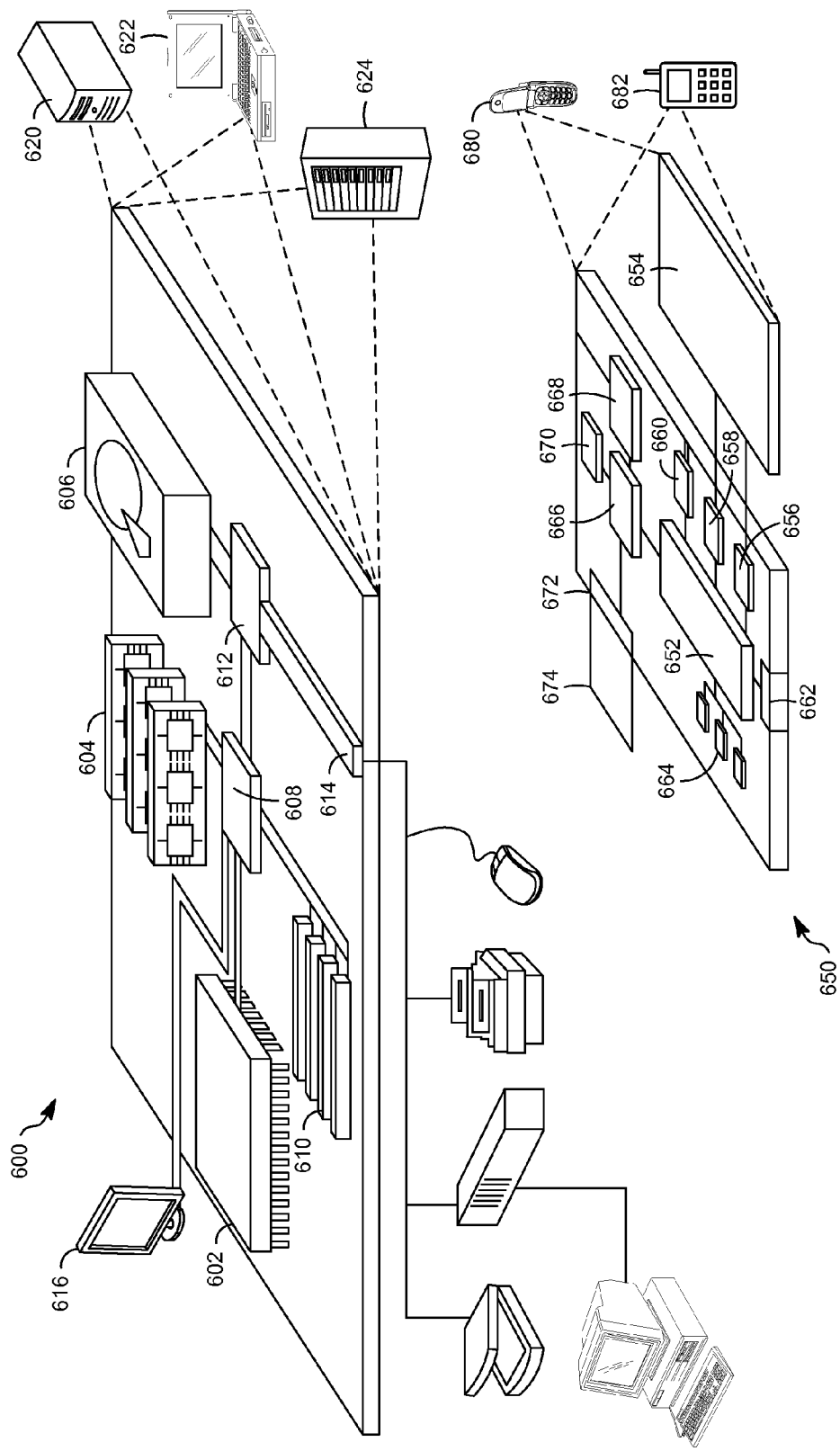
FIG. 6 is a schematic illustration of a generic computer device and a generic mobile computer device, which may be used with the techniques described herein.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM speech calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from speech telephone calls, may include recorded sound (e.g., speech messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A portable computing device, comprising:
    a portable computing device case enclosing one or more integrated circuits including at least a processor and a memory;
    a display for displaying graphical information to a user;
    a first temperature sensor that is physically integrated with the portable computing device case to measure an external ambient temperature; and a second temperature sensor to measure a temperature representative of an external surface of the portable computing device case, wherein the portable computing device may be in bodily contact with a user, and wherein the portable computing device is any one of a laptop computer, a hand held computer, a tablet computer, a net book computer, a personal digital assistant, an enterprise digital assistant, a smart phone, and a mobile computing device.

2. The portable computing device of claim 1, wherein the second temperature sensor is disposed on an external surface of the portable computing device case.

3. The portable computing device of claim 1, wherein the second temperature sensor is disposed in an outlet opening in the portable computing device case.

4. The portable computing device of claim 1, further comprising:

a cooling fan configured to direct airflow through the portable computing device case, and wherein the at least one processor is configured to execute instructions to control operation of the cooling fan, such that operation of the cooling fan is responsive, at least in part, to the external ambient temperature.

5. The portable computing device of claim 4, wherein the at least one processor executes an algorithm that defines an acceptable skin temperature of an outer surface of the portable computing device case, wherein the acceptable skin temperature is a function of the external ambient temperature.

6. The portable computing device of claim 5, wherein the at least one processor is configured to execute instructions to operate the cooling fan toward keeping a skin temperature of the outer surface of the portable computing device case at or below the acceptable skin temperature that is a function of the external ambient temperature.

7. The portable computing device of claim 6, wherein the instructions include instructions to operate the fan at different speeds according to different fan speed control curves for different external ambient temperature values.

8. The portable computing device of claim 6, wherein the least one processor is configured to execute instructions to throttle performance of heat-generating device components in the portable computing device case toward keeping the skin temperature of the outer surface of the portable computing device case at or below the acceptable skin temperature only after utilizing a full cooling capacity of the cooling fan.

9. A computing device, comprising:

a case housing computing device components;

a display for displaying graphical information to a user;

a fan configured to direct airflow into, and to exhaust air from within, the case to control an internal temperature inside the case;

a power consumption management circuit configured to throttle performance of a computing device component to reduce heat generation by the device component to control the internal temperature inside the case;

a first temperature sensor;

a second temperature sensor; and a processor configured to receive a measure of an external ambient temperature outside the case from the first temperature sensor, to receive a measure of a temperature of the case from the second temperature sensor, and, in response to the received measures, to trigger execution of at least one of the fan and the power management circuit.

10. The computing device of claim 9, wherein the second temperature sensor is physically integrated with the case.

11. The computing device of claim 9, wherein the second temperature sensor is disposed on an external surface the case.

12. The computing device of claim 9, wherein the second temperature sensor is disposed in an outlet opening in the case.

13. The computing device of claim 9, wherein the second temperature sensor is a remote temperature sensor disposed outside the case.

14. The computing device of claim 9, wherein the processor is configured to execute an algorithm that defines an acceptable skin temperature for the case as a function of the external ambient temperature.

15. The computing device of claim 14, wherein the algorithm, at least over a range of external ambient temperatures, defines the acceptable skin temperature in inverse proportion to the external ambient temperature so that a lower ambient temperature corresponds to a higher acceptable skin temperature and vice versa.

16. The computing device of claim 14, wherein the processor is configured to trigger execution of at least one of the fan and the power management circuit, such that a skin temperature of the computing device's case is maintained at or below the acceptable skin temperature defined for the external ambient temperature.

17. The computing device of claim 14, wherein the processor is configured to trigger the execution of the power consumption management circuit to maintain a skin temperature of the computing device's case at or below the acceptable skin temperature defined for the external ambient temperature.

18. The computing device of claim 14, wherein the processor is configured to trigger the execution of the fan to maintain a skin temperature of the computing device's case at or below the acceptable skin temperature defined for the external ambient temperature.

19. The computing device of claim 18, wherein the processor is configured to execute different fan speed control curves for different external ambient temperature values.

20. A method of controlling an internal temperature inside a computing device case, the method comprising;

obtaining a measure of an external ambient temperature outside the computing device case by measuring a temperature of air flowing in through an inlet opening defined through in the computer device case;

obtaining a measure of a temperature of the computing device case; and in response to the measure of the external ambient temperature and the measure of the temperature of the case, controlling operation of a fan to direct airflow into, and to exhaust air from within, the computing device case to control the temperature of the case.

21. The method of claim 20, wherein obtaining a measure of the external ambient temperature outside the computing device case includes:

using a temperature sensor that is physically integrated with the computing device case to measure the external ambient temperature outside the computing device case.

22. The method of claim 20, wherein obtaining a measure of the external ambient temperature outside the computing device case includes:

using a remote temperature sensor that is not physically integrated with the computing device case to provide the measure of the external ambient temperature outside the computing device case.

23. The method of claim 20, further comprising:
defining an acceptable skin temperature as a function of the external ambient temperature,
wherein controlling the operation of the fan in response to the measure of the external ambient temperature includes controlling the operation of the fan, such that the the temperature of the case does not exceed the acceptable skin temperature.

24. The method of claim 23, wherein defining the acceptable skin temperature as a function of the external ambient temperature includes:
at least over a range of ambient temperatures, defining the acceptable skin temperature in inverse proportion to the external ambient temperature so that a lower ambient temperature corresponds to a higher acceptable skin temperature and vice versa.

25. The method of claim 20 further comprising in response to the measure of the external ambient temperature, after the full cooling capacity of the fan has been utilized, controlling a power consumption management circuit configured to throttle performance of a computing device component to reduce heat generation by the device component to control the internal temperature inside the case.

26. The computing device of claim 9, wherein the computing device is any one of a laptop computer, a hand held computer, a tablet computer, a net book computer, a personal digital assistant, an enterprise digital assistant, a smart phone, a wearable computer and a mobile computing device.

27. The portable computing device of claim 1, wherein the first temperature sensor is disposed in an inlet opening of the computing device case through which air flows into the computing device case.

* * * * *